United States Patent
Nishizawa (10) Patent No.: US 8,982,417 B2
(45) Date of Patent: Mar. 17, 2015

(54) IMAGE PROCESSING APPARATUS THAT PREVENTS AN OCCURRENCE OF CONTOURING, NON-TRANSITORY COMPUTER-READABLE RECORDING MEDIUM STORING AN IMAGE PROCESSING PROGRAM, AND IMAGE PROCESSING METHOD

(71) Applicant: KYOCERA Document Solutions Inc., Osaka (JP)

(72) Inventor: Akira Nishizawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/093,708

(22) Filed: Dec. 2, 2013

(65) Prior Publication Data

US 2014/0153054 A1 Jun. 5, 2014

(30) Foreign Application Priority Data

Nov. 30, 2012 (JP) ................. 2012-263435
Nov. 30, 2012 (JP) ................. 2012-263438
Nov. 30, 2012 (JP) ................. 2012-263439

(51) Int. Cl.
  *H04N 1/405* (2006.01)
  *H04N 1/60* (2006.01)

(52) U.S. Cl.
  CPC ............ *H04N 1/6027* (2013.01); *H04N 1/4052* (2013.01)
  USPC .............. 358/2.1; 358/527; 358/500; 358/521

(58) Field of Classification Search
  CPC ..... H04N 5/225; H04N 1/405; H04N 1/2154; H04N 2101/00; H04N 1/40; H04N 1/52; H04N 1/2307; H04N 2201/0084
  USPC ........ 358/1.9, 2.1, 3.03, 3.05, 1.13, 500, 504, 358/515–518, 520–521, 527
  See application file for complete search history.

(56) References Cited

U.S. PATENT DOCUMENTS 4,631,740 A * 12/1986 Collins ........................ 377/76
5,249,164 A * 9/1993 Koz ............................. 348/552

FOREIGN PATENT DOCUMENTS

JP   03-050960      3/1991
JP   09-098290 A   4/1997

(Continued)

*Primary Examiner* — Thomas D Lee
*Assistant Examiner* — Stephen M Brinch
(74) *Attorney, Agent, or Firm* — McDonnell Boehnen Hulbert & Berghoff LLP (57) ABSTRACT

An image processing apparatus includes a color conversion processing unit, a modulation difference creating unit, a color value modulating unit, and an output unit. The color conversion processing unit performs color conversion from an input color value of a target image to a corresponding output color value to obtain a tentative output color value. The modulation difference creating unit creates modulation differences. The modulation differences include combinations that are obtained by either setting or not setting a value equivalent to the minimum resolution of the tentative output color value for each color component of the tentative output color value. The color value modulating unit performs modulation on the tentative output color value by adding or subtracting a modulation difference selected at random to or from the tentative output color value. The output unit outputs the target image according to the color value obtained after modulation.

20 Claims, 6 Drawing Sheets

(56) References Cited

FOREIGN PATENT DOCUMENTS

| JP | 11-261819 A | 9/1999 |
| JP | 2001-053969 A | 2/2001 |
| JP | 2010-259111 A | 11/2010 |

* cited by examiner

IMAGE PROCESSING APPARATUS THAT PREVENTS AN OCCURRENCE OF CONTOURING, NON-TRANSITORY COMPUTER-READABLE RECORDING MEDIUM STORING AN IMAGE PROCESSING PROGRAM, AND IMAGE PROCESSING METHOD

RELATED APPLICATIONS

This application is based upon, and claims priority to Japanese Patent Application No. 2012-263435 filed in the Japan Patent Office on Nov. 30, 2012, Japanese Patent Application No. 2012-263438 filed in the Japan Patent Office on Nov. 30, 2012, and Japanese Patent Application No. 2012-263439 filed in the Japan Patent Office on Nov. 30, 2012, the entire contents of which are incorporated herein by reference.

BACKGROUND

Unless otherwise indicated herein, the description in this section is not prior art to the claims in this application and is not admitted to be prior art by inclusion in this section.

The present disclosure relates to an image processing apparatus that performs color conversion and other image processes, a non-transitory computer-readable recording medium storing an image processing program, and an image process apparatus.

Typical image forming apparatuses, such as printers and multi-function peripherals ("MFPs"), use a pulse-surface-area modulation method or a pseudo modulation method (e.g. ordered dithering method, error diffusion method, or the like), in which a multi-valued color is artificially represented with a set of dots, to perform an image process.

In this image process, however, if the number of gradation steps is limited, for example, to improve stabilization or obtain a desired gradation curve, a visual discontinuity may occur in the image. This visual discontinuity may cause so-called "contouring" significantly reducing image quality.

To solve this problem of contouring, some technologies have been proposed. In an example of technology, to perform correction to improve gradation characteristics and prevent the occurrence of contouring, noise is added to a portion at which continuity is lost in input/output characteristics or a reference value in an error diffusion method is changed.

However, contouring has sometimes appeared around the perimeter of a color area during so-called gamut mapping, which is performed to correct a color area difference. In other words, contouring may appear when the same color value continues in a certain area. It has not been possible to prevent this contouring efficiently with the above technology.

The present disclosure relates to an image processing apparatus that prevents the occurrence of contouring by randomly performing fine modulation on tentative output color values obtained by color conversion without impairing image quality, a non-transitory computer-readable recording medium that has recorded an image processing program, and an image processing apparatus.

SUMMARY

An image processing apparatus in an aspect of the present disclosure includes a color conversion processing unit, a modulation difference creating unit, a color value modulating unit, and an output unit. The color conversion processing unit performs color conversion from an input color value of a target image to a corresponding output color value to obtain a tentative output color value. The modulation difference creating unit creates modulation differences. The modulation differences include combinations that are obtained by either setting or not setting a value equivalent to the minimum resolution of the tentative output color value for each color component of the tentative output color value. The color value modulating unit performs modulation on the tentative output color value by adding or subtracting a modulation difference selected at random to or from the tentative output color value. The output unit outputs the target image according to the color value obtained after modulation.

A non-transitory computer-readable recording medium storing an image processing program in an aspect of the present disclosure causes a computer to function as a color conversion processing unit, a modulation difference creating unit, a color value modulating unit, and an output unit. The color conversion processing unit performs color conversion from an input color value of a target image to a corresponding output color value to obtain a tentative output color value. The modulation difference creating unit creates modulation differences. The modulation differences include combinations that are obtained by either setting or not setting a value equivalent to the minimum resolution of the tentative output color value for each color component of the tentative output color value. The color value modulating unit performs modulation on the tentative output color value by adding or subtracting a modulation difference selected at random to or from the tentative output color value. The output unit outputs the target image according to the color value obtained after modulation.

An image processing method in an aspect of the present disclosure is executed to perform color conversion from an input color value of a target image to a corresponding output color value to obtain a tentative output color value. The image processing method creates modulation differences. The modulation differences include combinations that are obtained by either setting or not setting a value equivalent to the minimum resolution of the tentative output color value for each color component of the tentative output color value. The image processing method also performs modulation on the tentative output color value by adding or subtracting a modulation difference selected at random to or from the tentative output color value. The image processing method further outputs the image according to the color value obtained after the modulation.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Example apparatuses and methods are described herein. Other example embodiments or features may further be utilized, and other changes may be made, without departing from the spirit or scope of the subject matter presented herein. In the following detailed description, reference is made to the accompanying drawings, which form a part thereof FIG. 1 shows a block diagram illustrating a configuration of an image processing apparatus in an embodiment of the present disclosure.

Figure 1:
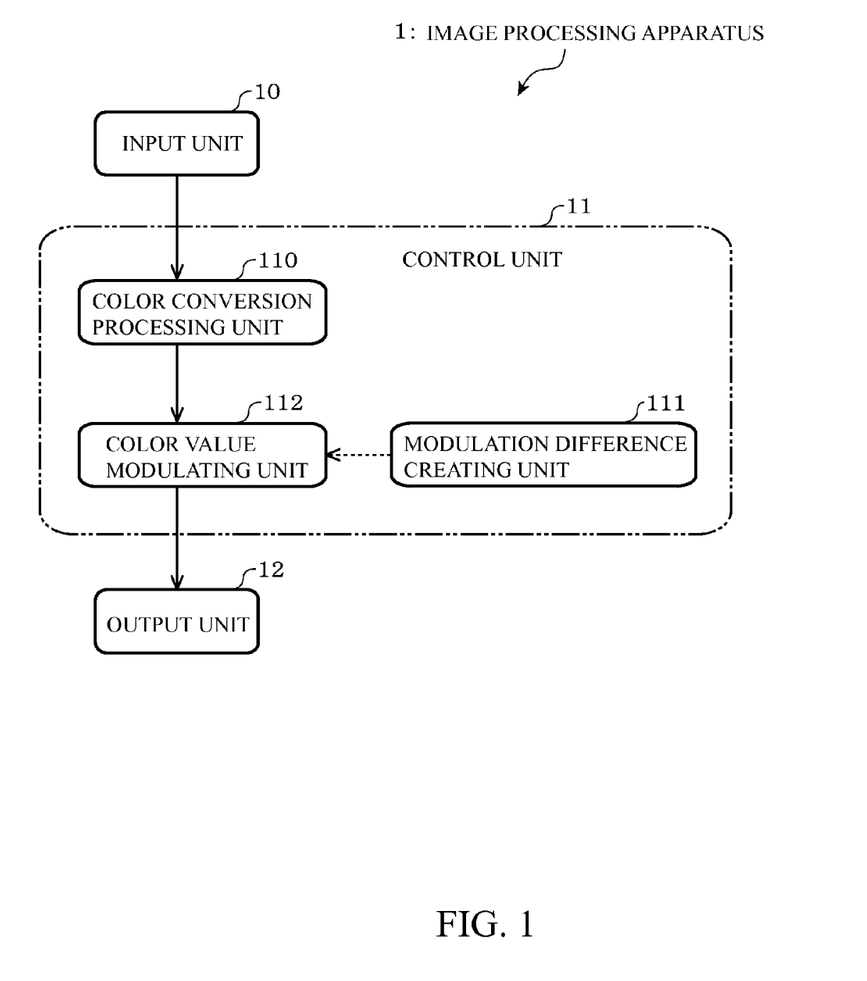
FIG. 1 shows a block diagram illustrating a configuration of an image processing apparatus in an embodiment of the present disclosure.

The image processing apparatus 1 in this embodiment illustrated in FIG. 1 includes an input unit 10, a control unit 11, and an output unit 12. The input unit 10 accepts a target image. The control unit 11 performs an image process on the accepted target image. The output unit 12 produces a printout or another output according to the image on which the image process has been performed by the control unit 11. The image processing apparatus 1 in this embodiment is, for example, a color printer, a multi-function peripheral ("MFP"), or another image forming apparatus.

The image process performed by the control unit 11 includes a process to perform color conversion from an input color value of the target image to an output color value and a process to create a dot image in the above-mentioned pulse-surface-area modulation method or a similar method. Specifically, the image process is performed as described below. The control unit 11 accepts print data from, for example, a personal computer. The image process then performs color conversion from an RGB value (input color value) assigned to a target object to a corresponding CMYK value (output color value). A dot image is then created through a rasterization process, a screen process, or the like.

Next, a print process is performed by applying toners in cyan ("C"), magenta ("M"), yellow ("Y"), and black ("K") to the created dot image.

The image processing apparatus 1 performs modulation that creates modulation differences for all the C, M, Y, and K output color values, where each modulation difference is equivalent to the minimum resolution of the relevant output color value. The modulation performed by the image processing apparatus 1 adds to or subtracts from a modulation difference selected at random from the color-converted CMYK values.

Accordingly, fine and randomized modulation is performed on the output color values, so it is possible to prevent the occurrence of contouring efficiently, which would otherwise is generated with the same consecutive color values.

First to third embodiments of the image processing apparatus 1 will be described below.

I. First Embodiment

Figure 2:
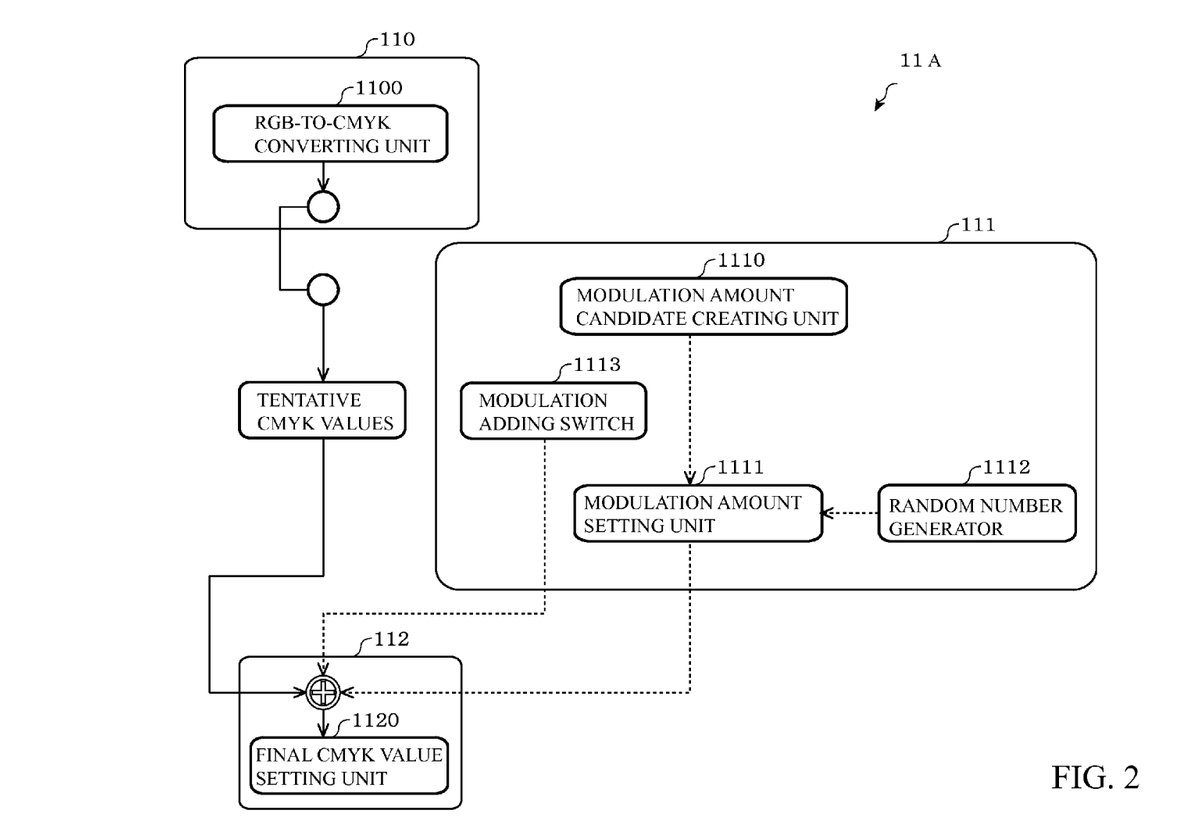
FIG. 2 shows a block diagram illustrating a functional configuration of an image processing apparatus in a first embodiment of the present disclosure.

FIG. 2 shows a block diagram illustrating a functional configuration of an image processing apparatus in a first embodiment of the present disclosure.

The control unit 11a in this embodiment illustrated in FIGS. 1 and 2 includes a color conversion processing unit 110, a modulation difference creating unit 111, and a color value modulating unit 112 as functional blocks. The color conversion processing unit 110 performs color conversion from an input color value of a target image to a corresponding output color value to obtain a tentative output color value. The modulation difference creating unit 111 creates modulation differences, where the modulation differences are combinations that are obtained by either setting or not setting a value equivalent to the minimum resolution of the tentative output color value for each color component of the tentative output color value. The color value modulating unit 112 performs modulation on the tentative output color value by adding or subtracting a modulation difference selected at random to or from the tentative output color value.

The color conversion processing unit 110 includes an RGB-to-CMYK converting unit 1100 that converts a color corresponding to a color value ("RGB value") of each pixel in the input image to a color value ("CMYK value") in a reproducible output format.

Specifically, the RGB-to-CMYK converting unit 1100 prestores a look-up table ("LUT"), which is represented in a three-dimensional orthogonal grid shape by grid points equivalent to correspondences between RGB values and CMYK values. The RGB-to-CMYK converting unit 1100 performs color conversion from the RGB value of a target pixel to its corresponding CMYK value with reference to this LUT. For RGB values positioned at coordinates between grid points, their corresponding CMYK values are obtained by known interpolation calculation.

A color value at each grid point is defined as an integer, and color values between grid points undergo a rounding process for decimal fractions or other processes to convert the color value to an integer. Thus, memory load and calculations can be reduced, compared to a case in which decimal fractions are included. Output color values ("CMYK values") that are obtained as a result of color conversion but have not undergone modulation will be herein referred to as tentative output color values (tentative CMYK values).

The modulation difference creating unit 111 includes a modulation amount candidate creating unit 1110, a modulation amount setting unit 1111, a random number generator 1112, and a modulation adding switch 1113.

The modulation amount candidate creating unit 1110 creates modulation differences (amount of modulation), where the modulation differences are combinations that are obtained by either setting or not setting a value equivalent to the minimum resolution for each channel of the tentative output color value. For example, the modulation amount candidate creating unit 1110 takes a group of combinations in which 1 or 0 is set for each of the C, M, Y, and K channels as the modulation difference. That is, there are 16 ($=2^4$) modulation differences listed below.

{0, 0, 0, 0}, {0, 0, 0, 1}, {0, 0, 1, 0}, {0, 0, 1, 1}, {0, 1, 0, 0}, {0, 1, 0, 1}, {0, 1, 1, 0}, {0, 1, 1, 1}, {1, 0, 0, 0}, {1, 0, 0, 1}, {1, 0, 1, 0}, {1, 0, 1, 1}, {1, 1, 0, 0}, {1, 1, 0, 1}, {1, 1, 1, 0}, {1, 1, 1, 1}

It is also possible to create 81 ($=3^4$) modulation differences by setting each of the C, M, Y, and K channels to 1, −1, or 0.

The modulation amount candidate creating unit 1110 stores the created modulation differences.

The modulation amount setting unit 1111 randomly selects one of the modulation differences created by the modulation amount candidate creating unit 1110. For example, the modulation amount candidate creating unit 1110 prestores correspondences between 16 modulation differences and random numbers that can be generated by the random number generator 1112 or their numerical range, and the modulation amount setting unit 1111 obtains, from these correspondences, the modulation difference corresponding to a random number actually obtained from the random number generator 1112.

The modulation amount setting unit 1111 outputs the selected modulation difference to the color value modulating unit 112.

The modulation adding switch 1113 makes a setting as to whether to perform modulation in response to a setting manipulation made by the user. The modulation adding switch 1113 outputs a setting signal to the color value modulating unit 112.

The color value modulating unit 112 includes a final CMYK value setting unit 1120 that performs unique modulation on a tentative output color value. Specifically, during modulation, the color value modulating unit 112 adds or subtracts the modulation difference received from the modulation difference creating unit 111 or from the tentative CMYK value that has been color-converted by the color conversion processing unit 110 and obtained from it.

If, for example, a modulation difference selected at random from the 16 modulation differences is added, the C, M, Y, and K values of the tentative CMYK value are increased individually by one or remain unchanged. If a modulation difference is subtracted, the C, M, Y, and K values of the tentative CMYK value are decreased individually by one or remain unchanged.

If 81 modulation differences are used, the C, M, Y, and K values of the tentative CMYK value are increased or decreased individually by one or remain unchanged, when a difference value selected at random is added to the CMYK value.

The output unit 12 outputs the relevant image according to the color values that have been modulated as described above.

If the color value modulating unit 112 receives, from the modulation adding switch 1113, a signal indicating that modulation is not to be performed, then the color value modulating unit 112 does not perform modulation.

In this case, the modulation difference creating unit 111 outputs the color-converted tentative output color value (tentative CMYK value) to the output unit 12 without alteration. The output unit 12 outputs the relevant image according to the tentative CMYK value.

This is effective if color value conversion is not preferable in a case, for example, in which the occurrence of contouring is not assumed and modulation performed at the expense of image quality is not advantageous.

If any one of the C, M, Y, and K values of the tentative CMYK value is 0 (minimum value of the color values 0 to 255) or 255 (maximum value of the color values 0 to 255), control may be carried out so that modulation is not performed for the color value of that specific channel. That is, it is possible to carry out modulation only when the tentative CMYK value is from 1 to 254. Thus, it is possible to prevent an error that would otherwise be caused if a modulation difference is subtracted in spite of the tentative output color value being 0 and of the final output color value thereby becoming a non-practicable value (negative value).

When modulation is carried out according to the tentative output color value as described above, the output color value can be corrected to a practicable value. This is advantageous in that corrective error handling can be omitted.

Due to a similar reason, if the tentative output color value is in a range from 0 to a certain value (127, for example) or less, it is also possible to perform modulation so that a modulation difference selected at random is subtracted if the tentative output color value exceeds a certain value (128 to 255) as a result of the modulation difference selected at random of being added.

As described above, in the image processing apparatus 1 (specifically, control unit 11a) in the first embodiment of the present disclosure, the modulation difference creating unit 111 creates a plurality of modulation differences, each of which is obtained by either setting or not setting a value equivalent to the minimum resolution of the tentative CMYK value for each of the C, M, Y, and K color components, and the color value modulating unit 112 performs modulation by adding or subtracting a modulation difference selected at random to or from the tentative CMYK value that has been color-converted by the color conversion processing unit 110.

Since output color values are finely changed to finely randomized color values, therefore, it is possible to prevent the occurrence of contouring efficiently, which would otherwise is generated with the same consecutive color values.

Since color values are modulated according to a value equivalent to the minimum resolution of the output color value, a tradeoff between the prevention of contouring and lower image quality can also be eliminated. That is, the image processing apparatus 1 in this embodiment can prevent the occurrence of contouring efficiently without lowering image quality.

II. Second Embodiment

Next, the image processing apparatus 1 in a second embodiment of the present disclosure will be described.

Figure 3:
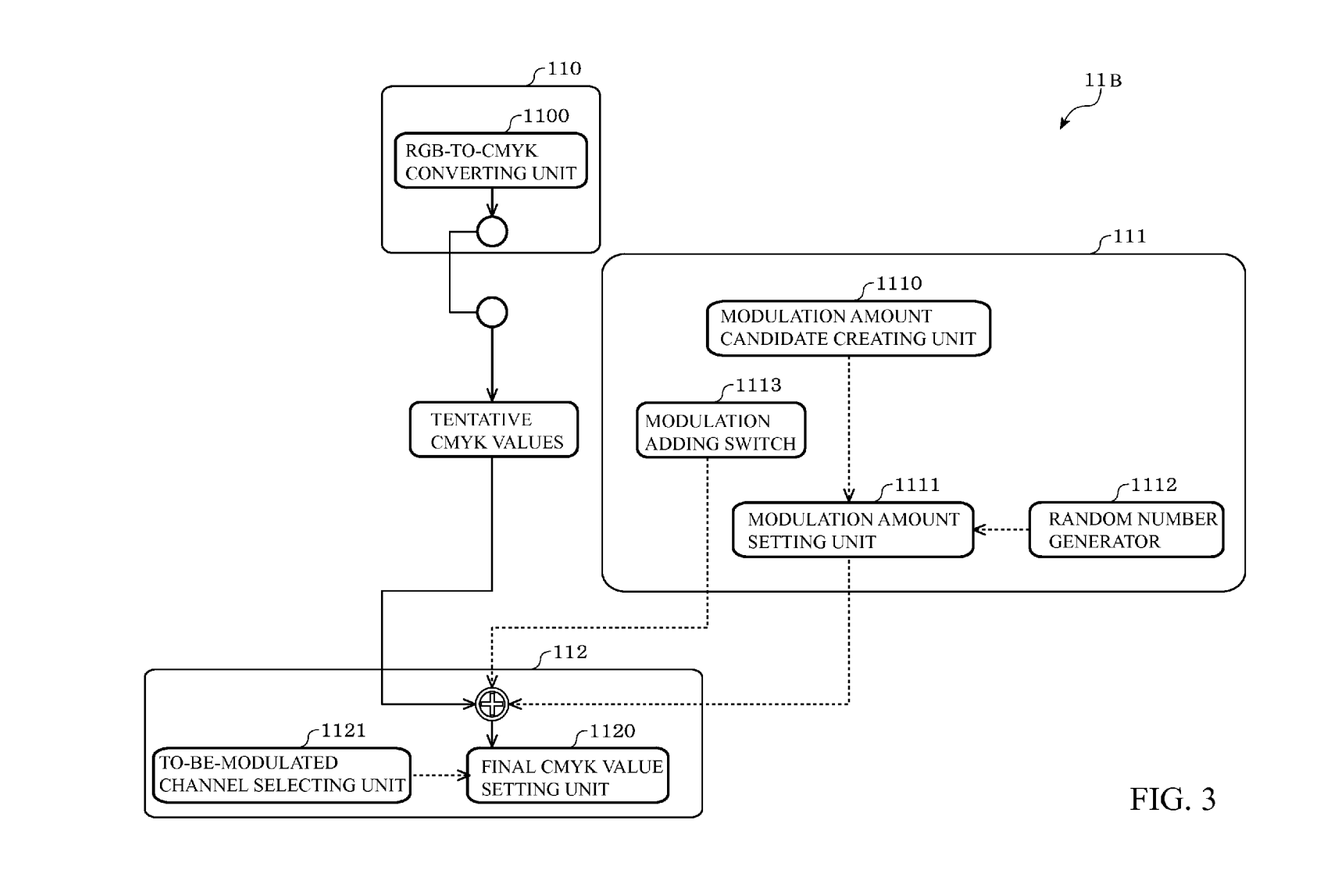
FIG. 3 shows a block diagram illustrating a functional configuration of an image processing apparatus in a second embodiment of the present disclosure.

FIG. 3 shows a block diagram illustrating a functional configuration of the image processing apparatus in this embodiment.

The image processing apparatus 1 in FIG. 3 is similar to the first embodiment described above in that a control unit 11b includes a color conversion processing unit 110, a modulation difference creating unit 111, and a color value modulating unit 112, but differs from the first embodiment in that the color value modulating unit 112 in the control unit 11b in this embodiment further includes a to-be-modulated channel selecting unit 1121.

The descriptions below will mainly focus on the to-be-modulated channel selecting unit 1121, and detailed descriptions of the other constituent units will be omitted.

The to-be-modulated channel selecting unit 1121 selects part or all of color components of a tentative color value in response to a selection manipulation by the user.

Figure 4:
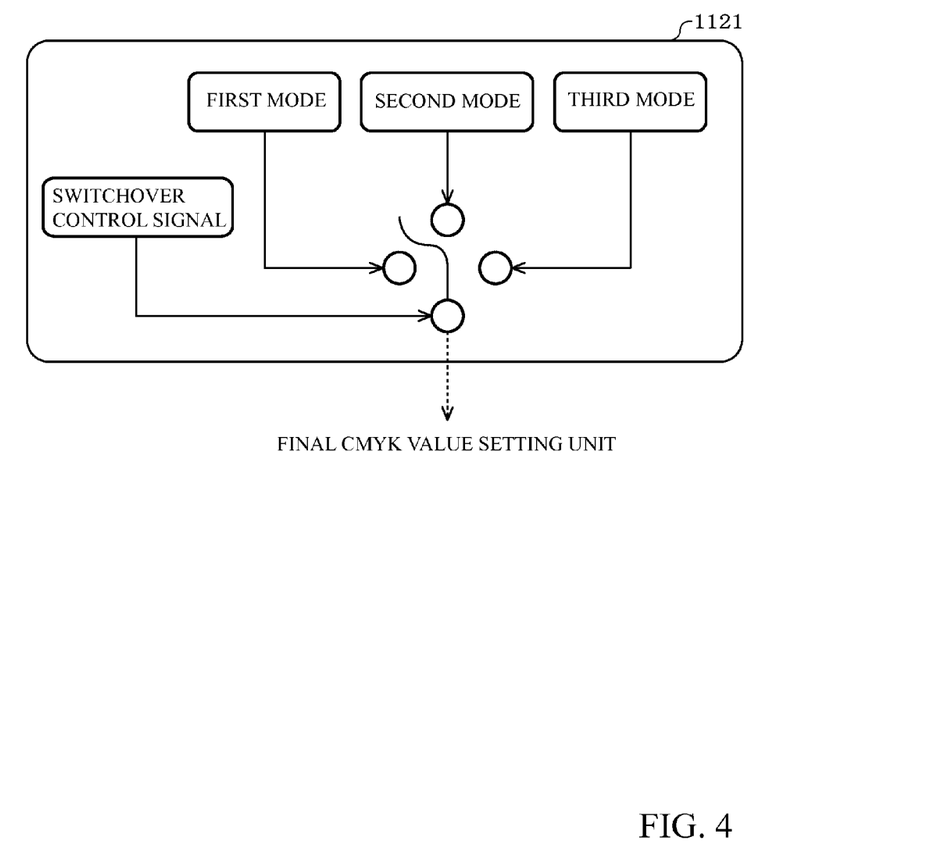
FIG. 4 shows illustrates a to-be-modulated channel selecting unit in an embodiment of the present disclosure.

Specifically, modes that are enabled according to the selected channel are provided, as illustrated in FIG. 4. The user can select any mode by performing a certain manipulation. In this embodiment, three modes are enabled according to the selected channel, which are a first mode in which only the K channel is modulated, a second mode in which only the C, M, and Y channels are modulated, and a third mode in which all channels, C, M, Y and K, are modulated.

When a mode is selected and channels to be modulated are thereby selected, a switchover control signal including identification information about the selected channels is output to the final CMYK value setting unit 1120. The final CMYK value setting unit 1120 identifies channels to be modulated from the identification information and modulates only the tentative output color values of the identified channels.

Another way to modulate only particular channels is to perform control so that a control signal including identification information is output to the modulation amount candidate creating unit 1110 and only a modulation difference of the selected channels is created.

If, for example, the first mode is selected, the modulation amount candidate creating unit 1110 creates a group of combinations in which 1 or 0 is set only for the K channel. As a result, the following two modulation differences are created.

{0, 0, 0, 0}, {0, 0, 0, 1},

If the second mode is selected, the modulation amount candidate creating unit 1110 creates a group of combinations in which 1 or 0 is set only for the C, M, and Y channels. As a result, the following eight (=$2^3$) modulation differences are created.

{0, 0, 0, 0}, {0, 0, 1, 0}, {0, 1, 0, 0}, {0, 1, 1, 0}, {1, 0, 0, 0}, {1, 0, 1, 0}, {1, 1, 0, 0}, {1, 1, 1, 0}

The modulation amount setting unit 1111 selects one of these modulation differences at random. The color value modulating unit 112 (specifically, final CMYK value setting unit 1120) adds or subtracts the selected modulation difference to or from the tentative output color value.

Thus, modulation is performed only on the tentative output color value of the selected color component, so the relevant image is output according to a color value in which modulation has been performed and the tentative output color values of the color components on which modulation has not been performed.

As described above, with the image processing apparatus 1 in the second embodiment of the present disclosure, the control unit 11b includes the to-be-modulated channel selecting unit 1121, by which the user can select a desired modulation mode.

If the user wants to avoid hue modulation, for example, the user may select the first mode, in which modulation is not performed on the C, M and Y channels, to perform modulation only on the brightness of the color value.

If the user does not want a change in granularity or a large change in brightness, the user can select the second mode, in which modulation is not performed on the K channel, to perform desired modulation on the C, M, and Y channels.

Accordingly, it is possible to provide the image processing apparatus 1 that not only has the same effect as in the first embodiment but also is superior in users' convenience.

III. Third Embodiment

Next, the image processing apparatus 1 in a third embodiment of the present disclosure will be described.

Figure 5:
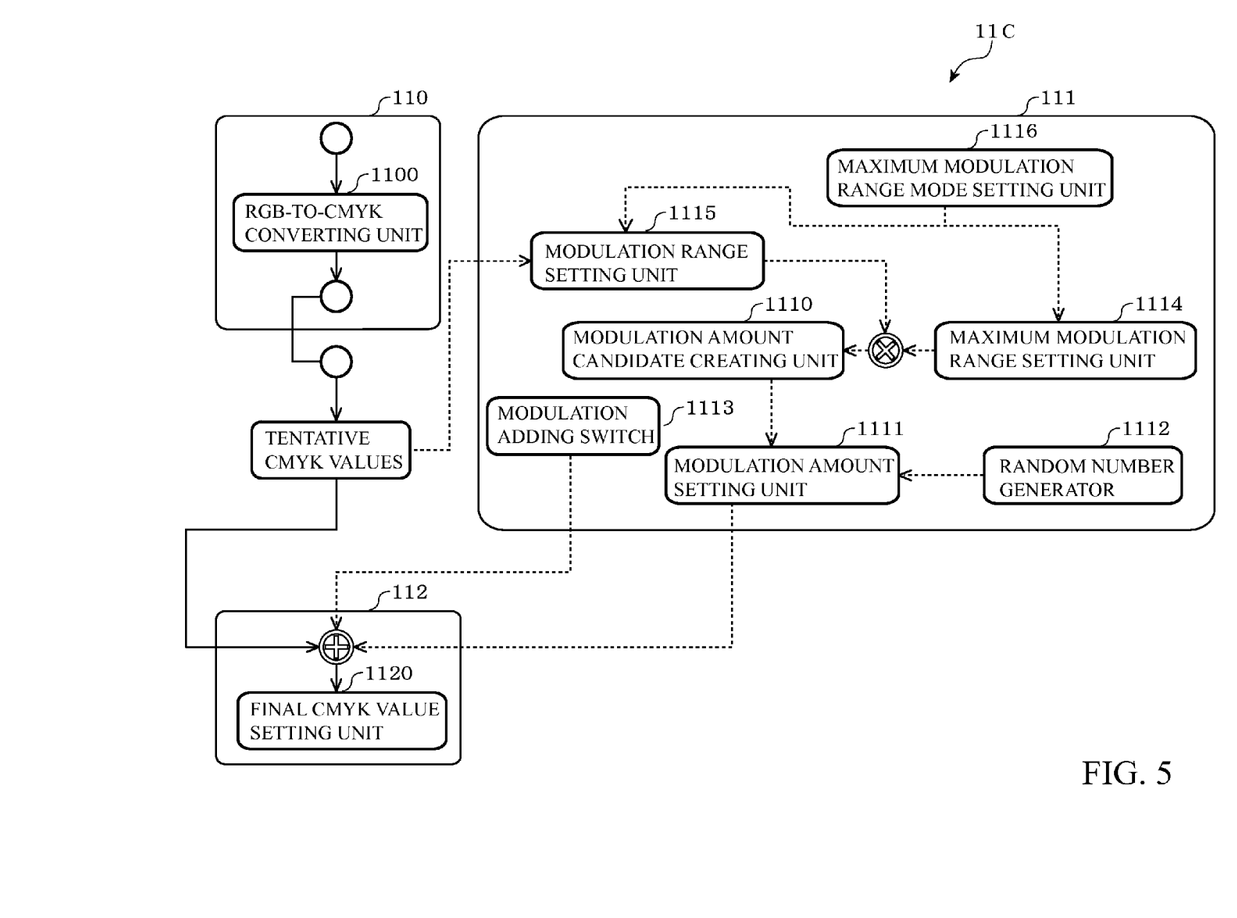
FIG. 5 shows a block diagram illustrating a functional configuration of an image processing apparatus in a third embodiment of the present disclosure.

FIG. 5 shows a block diagram illustrating a functional configuration of the image processing apparatus in this embodiment of the present disclosure.

The image processing apparatus 1 in FIG. 5 is similar to the first and second embodiments described above in that a control unit 11c includes the color conversion processing unit 110, modulation difference creating unit 111, and color value modulating unit 112, but differs from these embodiments in that the modulation difference creating unit 111 in the control unit 11c in this embodiment further includes a maximum modulation range setting unit 1114, a modulation range setting unit 1115, and a maximum modulation range mode setting unit 1116. The descriptions below will focus on these additional units included in the modulation difference creating unit 111, and detailed descriptions of the other constituent units will be omitted.

The maximum modulation range setting unit 1114 sets the maximum modulation range according to a maximum modulation range setting made by a user.

The modulation range setting unit 1115 sets a modulation range r according to the maximum modulation range and a ratio of a tentative output color value to the maximum value.

The modulation amount candidate creating unit 1110 creates modulation differences, where the modulation differences are combinations that are obtained by either setting or not setting a value equivalent to the minimum resolution of the tentative output color value, in the modulation range set by the modulation range setting unit 1115, for each color component of the tentative output color value.

If, for example, the maximum modulation range is set to an integer of ±n, then the modulation difference ΔM for each channel to which this maximum modulation range is applied is {−n, −n+1, −n+2, . . . , −2, −1, 0, 1, 2, . . . , n−1, n}. If n is 6, then the modulation difference for each channel to which this maximum modulation range is applied is {−6, −5, −4, −3, −2, −1, 0, 1, 2, 3, 4, 5, 6}.

If the maximum value of the tentative output color value is denoted Cv-max and the tentative output color value is denoted Cv-i, a ratio ρ[Cv-i] of Cv-i to Cv-max is obtained according to equation (1) below.

$$\rho[Cv\text{-}i] = (Cv\text{-}i/Cv\text{-max}) \tag{1}$$

Instead of a linear equation as in equation (1), a logarithmic curve equation or an S-shaped curve equation can also be used.

The modulation range r, which is expected to change according to the tentative output color value, can be obtained according to equation (2) below, by which the maximum modulation range is multiplied by ρ[Cv-i] and the resulting fractional part is rounded off $$r = \text{Round}[\rho[Cv\text{-}i] \times n] \tag{2}$$

Accordingly, when the modulation range is ρ, the modulation difference ΔM for each channel is {−r, −r+1, −r+2, . . . , −2, −1, 0, 1, . . . , r−1, r}.

If, for example, n is 6, Cv-i is 127, and Cv-max is 255, then ρ[127] is 127/255, so r is Round[ρ[127]×6](=3).

That is, when Cv-i[127] is true, the modulation difference for each channel is {−3, −2, −1, 0, 1, 2, 3}. If the tentative output color value is, for example, {127, 127, 127, 127}, therefore, the modulation amount candidate creating unit 1110 creates 2401 (=$7^4$) different modulation differences.

The modulation amount setting unit 1111 selects one of these modulation differences at random. The color value modulating unit 112 modulates the tentative output color value by adding or subtracting the selected modulation difference.

As described above, since the control unit 11c in the image processing apparatus 1 in this embodiment further includes the maximum modulation range setting unit 1114 and modulation range setting unit 1115, it is possible to expand the modulation range to an extent in which image quality is not lowered by tentative output color values, unlike the embodiments described above in which modulation is consistently performed in the minimum resolution range (−1 to +1).

That is, to address the problem that an effect of modulation on image quality differs depending on an actual tentative output color value or a possible range of tentative output color values, an allowable range of modulation is expanded or narrowed. For example, the larger the tentative output color value is, the wider the modulation range is set, and the smaller the tentative output color value is, the narrower the modulation range is set.

Accordingly, modulation can be performed in more different ways, enabling the occurrence of contouring to be suppressed more efficiently than in the embodiments described above.

Since the maximum modulation range mode setting unit 1116 is added to the modulation difference creating unit 111 as illustrated in FIG. 5, it is possible to set the maximum modulation range according to the mode selected by the user from various modes.

Specifically, in view of impressions and senses felt by human, some modes are set according to results obtained in preliminary investigations and experiments, and maximum modulation ranges corresponding to these modes are prestored.

For example, a detection limit mode and an allowance limit mode can be prestored. The detection limit mode is associated with a modulation range used as the maximum modulation range at a limit at which humans may or may not recognize that image quality and the like have changed as a result of modulation. The allowance limit mode is associated with a modulation range used as the maximum modulation range at a limit at which humans can recognize that image quality and the like have changed as a result of modulation, but a point at which humans can tolerate the change.

Accordingly, the image processing apparatus 1 in this embodiment can flexibly set an appropriate maximum modulation range with ease and can thereby improve users' convenience.

IV. Other Embodiments

Next, other embodiments of the image processing apparatus 1 in the present disclosure will be described.

Specifically, the image processing apparatus 1 can be configured so that the modulation range setting unit 1115 sets a modulation range according to a correspondence between the tentative output color value and the modulation range.

For example, the image processing apparatus 1 prestores a table including table data such as modulation range 1 corresponding to tentative output color values of 0 to 85, modulation range 2 corresponding to tentative output color values of 86 to 171, and modulation range 3 corresponding to tentative output color values of 172 to 255. The modulation range setting unit 1115 can be configured to retrieve, from the table, a modulation range corresponding to a color value range to which the actual tentative output color value belongs and sets the retrieved modulation range.

A logarithmic curve equation or an S-shaped curve equation can be substituted for a linear equation as in equation (1) to obtain the ratio $\rho[Cv\text{-}i]$ of the tentative output color value $Cv\text{-}i$ to the maximum output color value $Cv\text{-}max$.

Therefore, a modulation range N can be obtained not only by equation (2) above but also by the method described above.

Next, a non-transitory computer-readable recording medium that has recorded an image processing program will be described.

A color conversion processing function, a modulation difference creating function, a color value modulating function, and other functions of an image processing apparatus (such as a computer) in the above embodiments are achieved by an image processing program stored in a read-only memory ("ROM") or the like.

When the image processing program is read out by a control unit (such as a central processing unit ("CPU") in the image processing apparatus, the image processing program transmits a command to constituent elements of the image processing apparatus to cause the units corresponding to the functions (color conversion processing unit, modulation difference creating unit, and color value modulating unit) to be performed.

When the image processing program, which may be software, and the constituent units of the image processing apparatus, which may be hardware resources, cooperate, the above functions may be executed.

The image processing program that achieves the above functions can be stored not only in the ROM in the image processing apparatus but also in a non-transitory computer-readable recording medium, such as an external storage unit or a portable recording medium.

The external storage unit is an additional memory device that incorporates a compact disc-read-only memory ("CD-ROM") or another storage medium and is externally connected to the image processing apparatus 1. The portable recoding medium is a recording medium that can be inserted into a recoding medium driving unit (drive unit) and is portable, such as, for example, a flexible disk, a memory card, or a magneto-optical disk.

The image processing program recorded in the recording medium is loaded into a random-access memory ("RAM") or another memory device in the image processing apparatus and is executed by a CPU. When the image processing program is executed, the functions in the above embodiments may be achieved.

Another possible way to load the image processing program in the local image processing apparatus is to download an image processing program stored in another image processing apparatus to the RAM in the local image processing apparatus or an external storage unit through a communication line. When the downloaded program is executed by the CPU, the functions in the above embodiments may be achieved.

As described above, the present disclosure can also be practiced by a non-transitory computer-readable recording medium that has recorded a program.

The present disclosure is not limited to the embodiments described above; various modifications may be made without departing from the scope of the claims.

For example, the present disclosure can also be applied to image processing apparatuses other than printers and MFPs.

In the above embodiments, the RGB-to-CMYK converting unit 1100 uses a single LUT, in which input color values and output color values are directly associated, to perform color conversion process. However, this is not a limitation; if output color values are finally obtained from the image processing apparatus 1, there are no particular limitations to the LUT configuration, processes in color conversion process, and the like.

Figure 6:
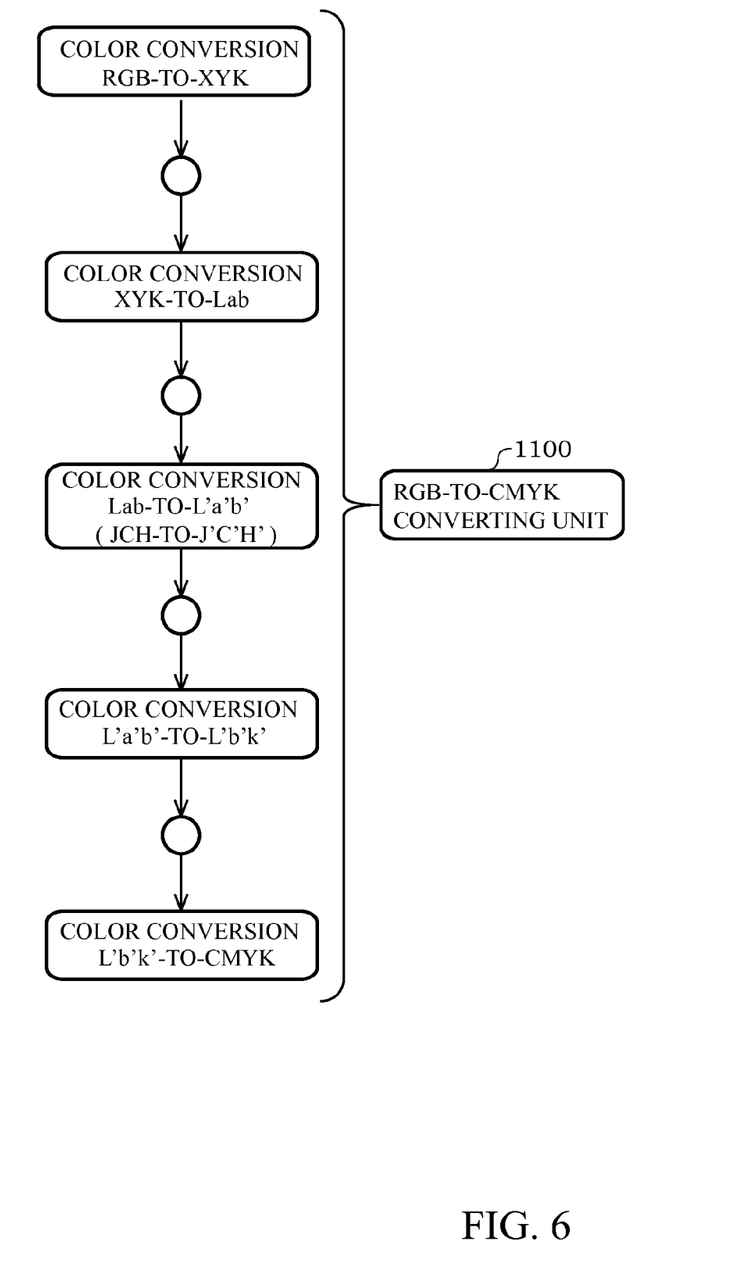
FIG. 6 illustrates another aspect of color conversion process in an embodiment of the present disclosure.

For example, as illustrated in FIG. 6, color conversion from RGB values (input color values) to CMYK values (output color values) can be performed in several steps through LUTs used for color conversion to an XYZ color space or a Lab color space.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses and methods within the scope of the disclosure, in addition to those enumerated herein, will be apparent to those skilled in the art from the foregoing descriptions. Such modifications and variations are intended to fall within the scope of the appended claims. With respect to any or all of the ladder diagrams and flow charts in the drawings and as discussed herein, each block and/or communication may represent a process of information and/or a transmission of information in accordance with example embodiments and alternative embodiments may be included within the scope of such example embodiments. Further, more or fewer blocks and/or functions may be used with any of the ladder diagrams and flow charts discussed herein, and these ladder diagrams and flow charts may be combined with one another, in part or in whole.

What is claimed is:

1. An image processing apparatus comprising:
a color conversion processing unit configured to perform color conversion from an input color value of a target image to a corresponding output color value to obtain a tentative output color value, wherein the tentative output color value includes a combination of color component values, and wherein the color component values correspond to a set of predetermined color components;
a modulation difference creating unit configured to create a plurality of modulation differences, wherein each modulation difference includes a combination of color component values that correspond to the set of predetermined color components, and wherein each color component value of the modulation difference is obtained by either setting or not setting the color component value as a value equivalent to a minimum resolution of the tentative output color value;
a color value modulating unit configured to perform modulation on the tentative output color value by, for each predetermined color component, adding to the color component value of the tentative output color value or subtracting from the color component value of the tentative output color value a corresponding color component value of a particular modulation difference, wherein the particular modulation difference is selected at random from the plurality of modulation differences; and
an output unit configured to output the target image according to the modulated tentative output color value.

2. The image processing apparatus according to claim 1, wherein if the tentative output color value is a minimum value or a maximum value in a color value range, the color value modulating unit is configured to not perform the modulation.

3. The image processing apparatus according to claim 1, wherein:
if the tentative output color value is less than or equal to a predetermined value, the color value modulating unit is configured to perform the modulation by, for each predetermined color component, adding the color component value of the particular modulation difference to the corresponding color component value of the tentative output color value; and
if the tentative output color value is greater than the predetermined value, the color value modulating unit is configured to perform the modulation by, for each predetermined color component, subtracting the color component value of the particular modulation difference from the corresponding color component value of the tentative output color value.

4. The image processing apparatus according to claim 1, further comprising a color selecting unit configured to select at least a portion of the predetermined color components in response to a selection manipulation, wherein
the color value modulating unit is configured to perform the modulation on the tentative output color value by, for each predetermined color component of the selected portion of predetermined color components, adding to the color component value of the tentative output color value or subtracting from the color component value of the tentative output color value a corresponding color component value of the particular modulation difference, and
the output unit is configured to output the target image according to the tentative output color value modulated by the selected portion of the predetermined color components of the particular modulation difference.

5. The image processing apparatus according to claim 4, wherein:
the output color value includes cyan ("C"), magenta ("M"), yellow ("Y"), and black ("B"); and
the color selecting unit is configured to select color components of the output value K, CMY, or CMYK.

6. The image processing apparatus according to claim 1, further comprising
a modulation range setting unit configured to set a modulation range according to the tentative output color value, wherein
the modulation difference creating unit is configured to create the plurality of modulation differences, wherein each modulation difference includes a combination of color component values that correspond to the set of predetermined color components, and wherein each color component value of the modulation difference is obtained by either setting or not setting the color component value as a value equivalent to the minimum resolution of the tentative output color value within the modulation range.

7. The image processing apparatus according to claim 6, wherein if the modulation range set by the modulation range setting unit is ±n, the modulation range setting unit is configured to set the modulation range to r, which is calculated according to equation $r=n \times (Cv\text{-}i/Cv\text{-}max)$, wherein Cv-max is a maximum value of the tentative output color value and Cv-i is the tentative output color value.

8. The image processing apparatus according to claim 1, further comprising:
a maximum modulation range setting unit configured to set a maximum modulation range in response to a maximum modulation range setting; and
a modulation range setting unit configured to set a modulation range according to the maximum modulation range and a ratio of the tentative output color value to the maximum value; wherein
the modulation difference creating unit is configured to create a plurality of modulation differences, wherein each modulation difference includes a combination of color component values that correspond to the set of predetermined color components, and wherein each color component value of the modulation difference is obtained by either setting or not setting the color component value as a value equivalent to the minimum resolution of the tentative output color value within the modulation range.

9. A non-transitory computer-readable recording medium storing an image processing program that causes a computer to function as an image processing apparatus, wherein the program causes the computer to function as:
a color conversion processing unit configured to perform color conversion from an input color value of a target image to a corresponding output color value to obtain a tentative output color value, wherein the tentative output color value includes a combination of color component values, and wherein the color component values correspond to a set of predetermined color components;

a modulation difference creating unit configured to create a plurality of modulation differences, wherein each modulation difference includes a combination of color component values that correspond to the set of predetermined color components, and wherein each color component value of the modulation difference is obtained by either setting or not setting the color component value as a value equivalent to a minimum resolution of the tentative output color value;

a color value modulating unit configured to perform modulation on the tentative output color value by, for each predetermined color component, adding to the color component value of the tentative output color value or subtracting from the color component value of the tentative output color value a corresponding color component value of a particular modulation difference, wherein the particular modulation difference is selected at random from the plurality of modulation differences; and an output unit configured to output the target image according to the modulated tentative output color value.

10. The non-transitory computer-readable recording medium according to claim 9, wherein:

if the tentative output color value is a minimum value or a maximum value in a color value range, the color value modulating unit is configured to not perform the modulation.

11. The non-transitory computer-readable recording medium according to claim 9, wherein:

if the tentative output color value is less than or equal to a predetermined value, the color value modulating unit is configured to perform the modulation by, for each predetermined color component, adding the color component value of the particular modulation difference to the corresponding color component value of the tentative output color value; and if the tentative output color value is greater than the predetermined value, the color value modulating unit is configured to perform the modulation by, for each predetermined color component, subtracting the color component value of the particular modulation difference from the corresponding color component value of the tentative output color value.

12. The non-transitory computer-readable recording medium according to claim 9, wherein the program causes the computer to further function as:

a color selecting unit configured to select at least a portion of the predetermined color components in response to a selection manipulation, wherein the color value modulating unit is configured to perform the modulation on the tentative output color value by, for each predetermined color component of the selected portion of predetermined color components, adding to the color component value of the tentative output color value or subtracting from the color component value of the tentative output color value a corresponding color component value of the particular modulation difference, and the output unit is configured to output the target image according to the tentative output color value modulated by the selected portion of the predetermined color components of the particular modulation difference.

13. The non-transitory computer-readable recording medium according to claim 9, wherein the program causes the computer to further function as:

a modulation range setting unit configured to set a modulation range according to the tentative output color value, wherein the modulation difference creating unit is configured to create the plurality of modulation differences, wherein each modulation difference includes a combination of color component values that correspond to the set of predetermined color components, and wherein each color component value of the modulation difference is obtained by either setting or not setting the color component value as a value equivalent to the minimum resolution of the tentative output color value within the modulation range.

14. The non-transitory computer-readable recording medium according to claim 9, wherein the program causes the computer to further function as:

a maximum modulation range setting unit configured to set a maximum modulation range in response to a maximum modulation range setting; and a modulation range setting unit configured to set a modulation range according to the maximum modulation range and a ratio of the tentative output color value to the maximum value; wherein the modulation difference creating unit is configured to create a plurality of modulation differences, wherein each modulation difference includes a combination of color component values that correspond to the set of predetermined color components, and wherein each color component value of the modulation difference is obtained by either setting or not setting the color component value as a value equivalent to the minimum resolution of the tentative output color value within the modulation range.

15. An image processing method comprising:

performing color conversion from an input color value of a target image to a corresponding output color value to obtain a tentative output color value, wherein the tentative output color value includes a combination of color component values, and wherein the color component values correspond to a set of predetermined color components;

creating a plurality of modulation differences, wherein each modulation difference includes a combination of color component values that correspond to the set of predetermined color components, and wherein each color component value of the modulation difference is obtained by either setting or not setting the color component value as a value equivalent to the minimum resolution of the tentative output color value;

performing modulation on the tentative output color value by, for each predetermined color component, adding to the color component value of the tentative output color value or subtracting from the color component value of the tentative output color value a corresponding color component value of a particular modulation difference, wherein the particular modulation difference is selected at random from the plurality of modulation differences; and outputting the target image according to the modulated tentative output color value.

16. The image processing method according to claim 15, wherein:

if the tentative output color value is a minimum value or a maximum value in a color value range, performing the modulation.

17. The image processing method according to claim 15, wherein:

if the tentative output color value is less than or equal to a predetermined value, performing the modulation by, for each predetermined color component, adding the color component value of the particular modulation difference to the corresponding color component value of the tentative output color value; and if the tentative output color value is greater than the predetermined value, performing the modulation by, for each predetermined color component, subtracting the color component value of the particular modulation difference from the corresponding color component value of the tentative output color value.

18. The image processing method according to claim 15, further comprising:
  selecting at least a portion of the predetermined color components in response to a selection manipulation, wherein selecting at least a portion of the predetermined color components in response to a selection manipulation includes:
    performing the modulation on the tentative output color value by, for each predetermined color component of the selected portion of predetermined color components, adding to the color component value of the tentative output color value or subtracting from the color component value of the tentative output color value a corresponding color component value of the particular modulation difference; and
    outputting the target image according to the tentative output color value modulated by the selected portion of the predetermined color components of the particular modulation difference.

19. The image processing method according to claim 15, further comprising:
  setting a modulation range according to the tentative output color value, wherein setting a modulation range according to the tentative output color value includes:
    creating the plurality of modulation differences, wherein each modulation difference includes a combination of color component values that correspond to the set of predetermined color components, and wherein each color component value of the modulation difference is obtained by either setting or not setting the color component value as a value equivalent to the minimum resolution of the tentative output color value within the modulation range.

20. The image processing method according to claim 15, further comprising:
  setting a maximum modulation range in response to a maximum modulation range setting;
  setting a modulation range according to the maximum modulation range and a ratio of the tentative output color value to the maximum value; and
  creating a plurality of modulation differences, wherein each modulation difference includes a combination of color component values that correspond to the set of predetermined color components, and wherein each color component value of the modulation difference is obtained by either setting or not setting the color component value as a value equivalent to the minimum resolution of the tentative output color value within the modulation range.

* * * * *